United States Patent [19]

Elder

[11] 4,243,305
[45] Jan. 6, 1981

[54] BOW AND HINGE MOUNTING ASSEMBLY FOR EYEGLASSES FRAMES

[76] Inventor: Eugene E. Elder, 121 Belmont, Hebron, Nebr. 68370

[21] Appl. No.: 901,425

[22] Filed: May 1, 1978

[51] Int. Cl.³ .............................................. G02C 5/14
[52] U.S. Cl. .................................. 351/121; 351/153; 16/128 A
[58] Field of Search .................... 351/121, 14 D, 153, 351/141, 119, 90-102; D6/191; d8/109; 16/128 A; 2/14

[56] References Cited

U.S. PATENT DOCUMENTS

| | | | |
|---|---|---|---|
| 2,379,928 | 8/1945 | Rosenheim | 351/121 |
| 2,443,249 | 6/1948 | Jackson | 351/121 |
| 2,587,472 | 2/1952 | Hoffmaster | 351/121 |
| 2,774,098 | 12/1956 | Tieri | 351/153 |
| 3,427,681 | 2/1969 | Smith | 351/153 |
| 3,475,084 | 10/1969 | Gil et al. | 351/153 |
| 3,609,018 | 9/1971 | Marolla | 351/92 |
| 3,890,672 | 6/1975 | Berthagen | 351/121 |
| 4,018,516 | 4/1977 | Hideaki et al. | 351/121 |
| 4,084,889 | 4/1978 | Vischer | 351/121 |
| 4,153,347 | 5/1979 | Myer | 351/116 |

FOREIGN PATENT DOCUMENTS

| | | | |
|---|---|---|---|
| 146058 | 4/1952 | Australia | 351/116 |
| 2039455 | 2/1972 | Fed. Rep. of Germany | 351/153 |
| 2221746 | 3/1973 | Fed. Rep. of Germany | 351/121 |

Primary Examiner—John K. Corbin
Assistant Examiner—B. W. de los Reyes
Attorney, Agent, or Firm—Lowe, Kokjer, Kircher, Wharton & Bowman

[57] ABSTRACT

This invention discloses a bow and hinge mounting assembly for pivotally securing a bow to an eyeglasses frame having a upper frame portion and a lower frame portion. In one embodiment of this invention, a single mounting screw is used to secure the upper portion of the eyeglasses frame to the lower portion of the frame and to pivotally mount the bow to the eyeglasses frame. The lower portion of the eyeglasses frame has a lower mounting plate that protrudes outward therefrom. A mounting pin rigidly secured to the lower mounting plate is arranged to pivotally engage a hole in the mounting portion of the bow. The bow is kept in place on the mounting pin by means of a upper retaining plate. This plate protrudes outward from the upper portion of the eyeglasses frame and is arranged to contact the top of the mounting pin to thereby retain the bow in place upon the mounting pin. In a second embodiment of the invention, the upper retaining plate is eliminated and the bow is kept in place upon the mounting pin by means of a flathead screw that threadably engages a hole in the mounting pin. The bow used in both embodiments of the invention includes a retaining arm that restricts the outward pivotal movement of the bow.

3 Claims, 7 Drawing Figures

BOW AND HINGE MOUNTING ASSEMBLY FOR EYEGLASSES FRAMES

This invention relates generally to a bow and hinge mounting assembly for pivotally securing a bow to an eyeglasses frame. Selection of corrective lenses is only the first step in curing a visual defect. Once the appropriate corrective lenses have been selected, they must be mounted in an eyeglasses frame that provides a comfortable and proper fit for the wearer of the eyeglasses. In order to ensure a proper fit, the length and configuration of the bow must be selected in accordance with the facial features of the person who is going to wear the eyeglasses. If the bow is too short, the portion of the bow which wraps around the ear constantly presses against the ear producing sensitive areas that are easily irritated by continuous use of the eyeglasses. A bow that is too long, on the other hand, provides improper support for the eyeglasses frame so that the frame is constantly sliding down the bridge of the nose impairing visual acuity and constantly annoying the person wearing the eyeglasses.

It is therefore an object of the present invention to provide a bow and hinge mounting assembly for eyeglasses frames which allows for bows of varying lengths to be quickly and easily attached to the eyeglasses frame thereby ensuring the proper fit of the eyeglasses frame.

Another object of the present invention is to provide a bow and hinge mounting assembly for eyeglasses frames which is economical to use.

A further object of the present invention is to provide a bow and hinge mounting assembly for eyeglasses frames which pivotally secures the bow to the eyeglasses frame.

A further object of the present invention is to provide a bow and hinge mounting assembly for eyeglasses frames which uses a single screw to secure the upper portion of the eyeglasses frame to the lower portion of the eyeglasses frame and to pivotally mount the bow to the eyeglasses frame.

An additional object of the present invention is to provide a bow and hinge mounting assembly for eyeglasses frames which pivotally mounts the bow to an eyeglasses frame having an upper frame portion and a lower frame portion by means of a mounting pin which is arranged to pivotally engage a hole in the mounting portion of the bow. The mounting pin is rigidly secured to a lower mounting plate which is fixed to the lower frame portion and extends outward therefrom. An upper mounting member which is attached to the upper portion of the eyeglasses frame has a retaining plate protruding therefrom to retain the bow in place on the mounting pin. The upper portion of the eyeglasses frame is secured to the lower portion by means of a mounting screw which is arranged to pass through an aperture in the upper mounting member and to threadably engage an internally threaded hole in the lower mounting plate.

It is a further object of the present invention to provide a bow and hinge mounting assembly for eyeglasses frames which pivotally mounts the bow to an eyeglasses frame having an upper frame portion and a lower frame portion by means of a mounting pin which is arranged to pivotally engage a hole in the mounting portion of the bow. A flat-headed screw threadably engages an internally threaded hole in the mounting pin to retain the bow in place on the mounting pin. The mounting pin is rigidly secured to a lower mounting plate which is fixed to the lower frame portion and extends outward therefrom. An upper mounting member is fixedly attached to the upper portion of the eyeglasses frame. The upper portion of the eyeglasses frame is secured to the lower portion by means of a mounting screw which is arranged to pass through an aperture in the upper mounting member and to threadably engage an internally threaded hole in the lower mounting plate.

It is an additional object of the present invention to provide a bow and hinge mounting assembly for eyeglasses frames which includes a limiting arm on the bow to restrict the outward pivotal movement of the bow.

Other objects of the invention will be made clear or become apparent from the following description and claims when read in light of the accompanying drawings wherein:

Figure 1:
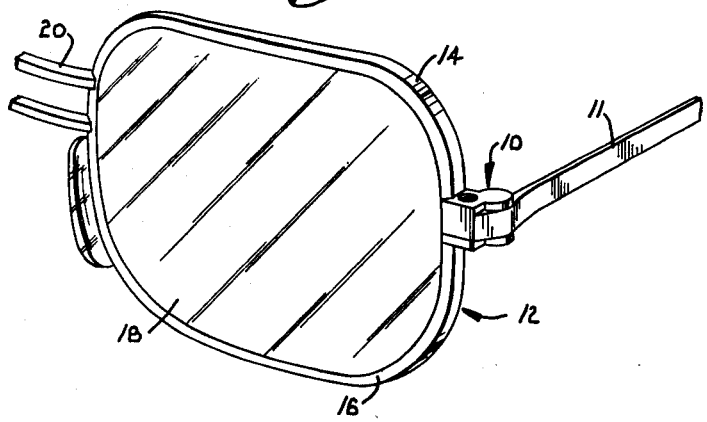
FIG. 1 is a perspective view of half an eyeglasses frame with the bow and hinge mounting assembly of the present invention incorporated thereon.

Referring now to FIG. 1, the bow and hinge mounting assembly 10 of the present invention is shown in this figure pivotally mounting a bow 11 to an eyeglasses frame 12. As shown in FIG. 1, the eyeglasses frame has an upper frame portion 14 and a lower frame portion 16 which surround a corrective lens 18. The upper and lower frame portions are fixedly secured to each other at the cross piece 20 and are constructed of metal or some other type of resilient material.

Figure 2:
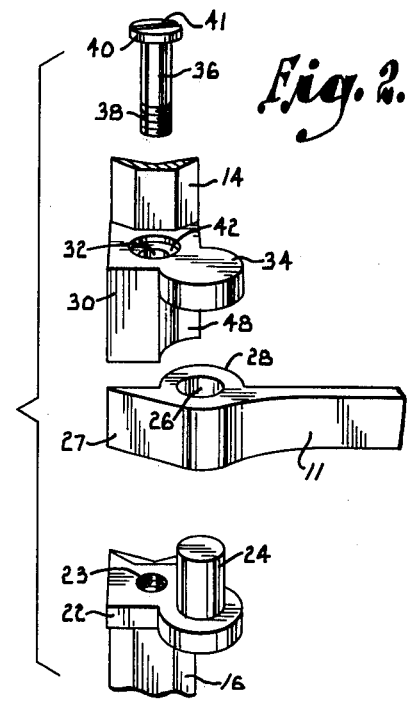
FIG. 2 is an exploded view of the bow and hinge mounting assembly of the present invention.
Figure 3:
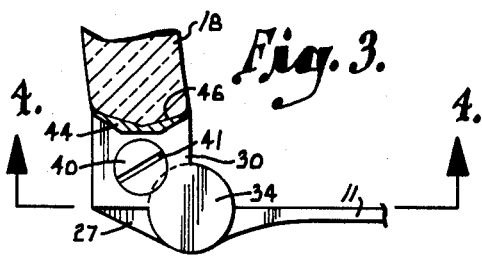
FIG. 3 is a fragmentary top plan view of the bow and hinge mounting assembly.
Figure 4:
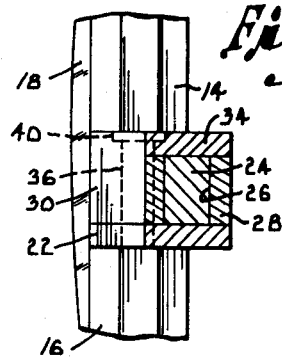
FIG. 4 is a cross sectional view taken along 4—4 of FIG. 3.

Referring now to FIGS. 2, 3 and 4, the bow and hinge mounting assembly 10 is shown in greater detail in these figures. As shown in these figures, the upper portion 14 of the eyeglasses frame is separated from the lower portion 16 of the frame at this point to allow for the mounting of a corrective lens within the frame.

The bow and hinge mounting assembly is basically comprised of a lower mounting plate 22 which is securely fixed to the lower portion of the eyeglasses frame. The lower mounting plate protrudes outward from the lower frame portion and has an internally threaded hole 23 provided therein. A mounting pin 24 is also secured to the lower mounting plate. The mounting pin 24 is arranged to engage a hole 26 in the mounting portion 28 of the bow to pivotally mount the bow to the eyeglasses frame. Hole 26 has a diameter slightly greater than that of mounting pin 24 to allow for free pivotal movement of the bow about this point. The bow is also provided with a limiting arm 27 which restricts the outward pivotal movement of the bow.

An upper mounting member 30 is rigidly fixed to the upper portion of the eyeglasses frame. The upper mounting member has a mounting channel 32 passing through it and a retaining plate 34 rigidly secured to it. A securing member 36 is provided to secure the upper portion of the eyeglasses frame to the lower portion of the frame. The securing member is comprised of a slender pin having a threaded end portion 38 and an enlarged head portion 40 which has a slot 41 cut therein. The securing member 36 is arranged to pass through mounting channel 32 and to threadably engage the internally threaded hole 23 in the lower mounting plate 22. Channel 32 is slightly greater in diameter than securing member 36 thereby allowing for rotatable movement of the member within this channel. The upper mounting member includes a depressed area 42 about channel 32. This depressed area conforms to the head portion 40 of securing member 36.

In use, the corrective lens 18 is initially mounted within the eyeglasses frame by forcing the upper portion 14 of the eyeglasses frame away from the lower portion 16 of the frame a distance sufficient to allow the corrective lens to be positioned between the upper and lower frame portions. As shown in FIG. 3, the upper and lower portions of the eyeglasses frame have a channel 44 cut in their interior surface. This channel engages a raised portion 46 on the outer surface of the corrective lens to secure the lens in place within the eyeglasses frame.

Once the corrective lens has been properly positioned, the bow 11, is pivotally mounted to the eyeglasses frame by inserting mounting pin 24 into hole 26. After the bow is properly positioned on mounting pin 24, securing member 36 is inserted through mounting channel 32 to threadably engage the internally threaded hole 23 in the lower mounting plate 22. As securing member 36 is tightened, the upper and lower frame portions are pulled toward each other to securely hold the corrective lens in place within the eyeglasses frame. The retaining plate 34 is also pulled toward mounting pin 24. Once the securing member is fully tightened, the upper retaining plate contacts the top of mounting pin 24 locking the bow in place on the mounting pin. The head portion of securing member 36 fits within the depressed area 42 of the upper mounting member when the securing member is fully tightened. In this way, the top of the head portion is even with the upper surface of the upper mounting member.

It should be pointed out at this time that the upper mounting member has a curved exterior surface area (generally designated by the numeral 48) below the upper retaining plate that conforms to the arcuate shape of the mounting portion of the bow. This arcuate configuration of the mounting portion of the bow and the exterior surface of the upper mounting member allows for free pivotal movement of the bow about the mounting pin 24. Limiting arm 27 contacts the upper mounting member when the bow is fully extended thereby restricting the outward pivotal movement of the bow.

Figure 5:
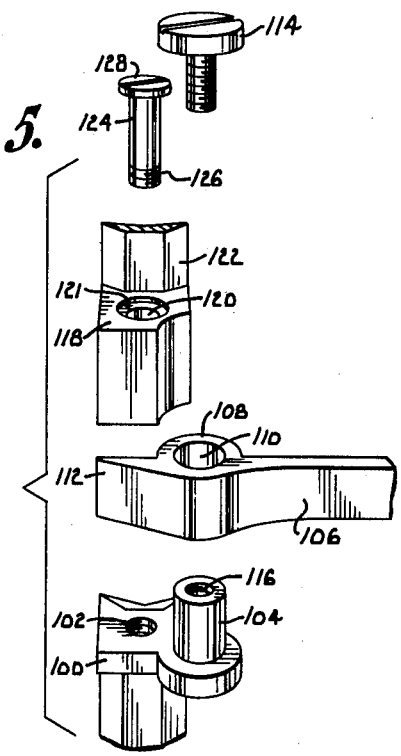
FIG. 5 is an exploded view of an alternate embodiment of the bow and hinge mounting assembly of the present invention.
Figure 6:
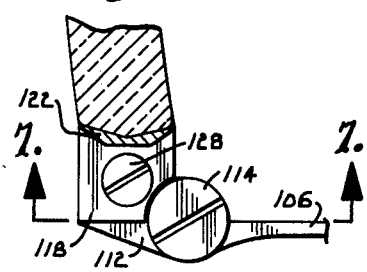
FIG. 6 is a fragmentary top plan view of the alternate embodiment of the bow and hinge mounting assembly.
Figure 7:
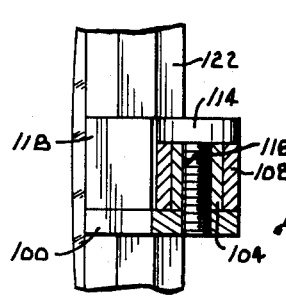
FIG. 7 is a cross sectional view of a bow and hinge mounting assembly taken along 7—7 of FIG. 6.

An alternate embodiment of the bow and hinge mounting assembly is shown in FIGS. 5, 6 and 7. As shown in these figures, the upper retaining plate is replaced by a retaining screw to make it even easier to mount the bow to the eyeglasses frame.

Referring now to FIGS. 5, 6 and 7, the mounting assembly shown in these figures is comprised of a lower mounting plate 100 fixed to the lower portion of the eyeglasses frame. The lower mounting plate has an internally threaded hole 102 provided through it and a mounting pin 104 secured to it. The bow 106 has a mounting portion 108 with a hole 110 provided therein and a limiting arm 112 protruding therefrom. Retaining screw 114 threadably engages an internally threaded hole 116 in the mounting pin 104 to retain the bow on the mounting pin.

An upper mounting member 118 is rigidly fixed to the upper portion of the eyeglasses frame 122. The mounting member has a mounting channel 120 passing through it and a depressed area 121 surrounding the mounting channel. A securing member 124 having a threaded end portion 126 and an enlarged head portion 128 is provided to secure the upper and lower frame portions to each other.

In use, the corrective lens is first positioned within the eyeglasses frame as described above. Once the eyeglasses frame is properly positioned securing member 124 is inserted through mounting channel 120 to threadably engage the internally threaded hole 102 in the lower mounting plate 100. As the securing member is tightened, the upper portion of the eyeglasses frame is pulled towards the lower portion of the frame causing the corrective lens to be mounted within the frame.

Once the corrective lens is mounted, the bow is pivotally mounted to the eyeglasses frame by inserting mounting pin 104 through the hole 110 in the mounting portion 108 of the bow. The bow is retained in place on the mounting pin by retaining screw 114 which is screwed into the internally threaded hole 116 in the mounting pin.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. In an eyeglass structure having a bow and a split frame which includes a lens encasement having upper and lower lens engaging members separated from one another at a split portion of the frame, the improvement comprising:

upper and lower mounting plates connected with and extending outwardly from the respective upper and lower lens engaging members at locations adjacent said split frame portion;

a mounting aperture in said bow having upper and lower ends and presenting an opening extending between said ends, said mounting aperture being interposed between said mounting plates with said upper and lower ends disposed against the respective upper and lower mounting plates;

a pin rigidly connected with one of said mounting plates in projection therefrom substantially through said opening of the mounting aperture to one of said upper and lower ends to mount the bow to said lens casement for pivotal movement relative thereto about a hinge axis defined by said pin; and a fastening element extending between said mounting plates at a location offset from said pin to hold said lens engaging members together at said split portion of the frame and to secure said mounting plates against the ends of said mounting aperture with said pin extending substantially through said opening of the mounting aperture to pivotally mount the bow to the frame.

2. The improvement set forth in claim 1, wherein said pin is integral with said one mounting plate.

3. The improvement set forth in claim 1, including a rigid block extending between said mounting plates, said fastening element extending between said mounting plates through said block.

* * * * *